United States Patent
Antraygue

(10) Patent No.: US 12,286,213 B2
(45) Date of Patent: Apr. 29, 2025

(54) STOPS FOR FORCE SENSOR

(71) Applicant: Ratier-Figeac SAS, Figeac (FR)

(72) Inventor: Cedric Antraygue, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 0 days.

(21) Appl. No.: 18/185,517

(22) Filed: Mar. 17, 2023

(65) Prior Publication Data
US 2023/0322361 A1  Oct. 12, 2023

(30) Foreign Application Priority Data
Apr. 8, 2022  (EP) ..................... 22305488

(51) Int. Cl.
*B64C 13/04* (2006.01)
*G05G 5/04* (2006.01)
*G05G 9/047* (2006.01)

(52) U.S. Cl.
CPC .............. *B64C 13/04* (2013.01); *G05G 5/04* (2013.01); *G05G 9/047* (2013.01); *G05G 2505/00* (2013.01)

(58) Field of Classification Search
CPC .................. B64C 13/04; G05G 5/04
See application file for complete search history.

(56) References Cited

U.S. PATENT DOCUMENTS

| | | | |
|---|---|---|---|
| 6,352,477 B1* | 3/2002 | Soma | G05G 9/047 345/161 |
| 8,050,780 B2 | 11/2011 | Tessier et al. | |
| 8,991,771 B2 | 3/2015 | Antraygue | |
| 2013/0256463 A1* | 10/2013 | Antraygue | B64C 13/0421 244/234 |
| 2014/0353433 A1* | 12/2014 | Gemmati | B64C 13/0427 244/234 |
| 2019/0294197 A1 | 9/2019 | Kondo et al. | |

OTHER PUBLICATIONS

European Search Report for Application No. 22305488.3, mailed Sep. 13, 2022, 9 pages.

* cited by examiner

*Primary Examiner* — Justin M Benedik
(74) *Attorney, Agent, or Firm* — CANTOR COLBURN LLP

(57) ABSTRACT

A piloting device for piloting an aircraft includes a piloting member suitable for being actuated by a pilot, a mechanism for mounting and guiding in rotation the piloting member about at least one rotation axis with respect to a frame, at least one force sensor connected between the piloting member. The mechanism includes at least one sensing element configured to produce a signal upon deformation indicative of a force applied to the piloting member. The force sensor comprises at least one pair of bearing surfaces. The device also includes at least one pair of stops configured to limit the angular amplitude of rotation of the piloting member with respect to the frame on abutment of the at least one pair of bearing surfaces with at least one pair of stops. The stops or at least one of the bearing surfaces comprises a compliant material.

13 Claims, 6 Drawing Sheets

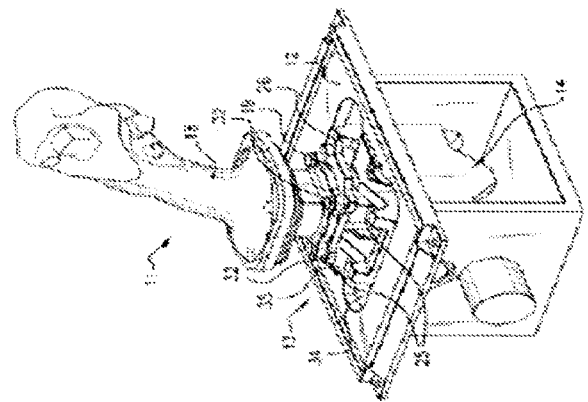
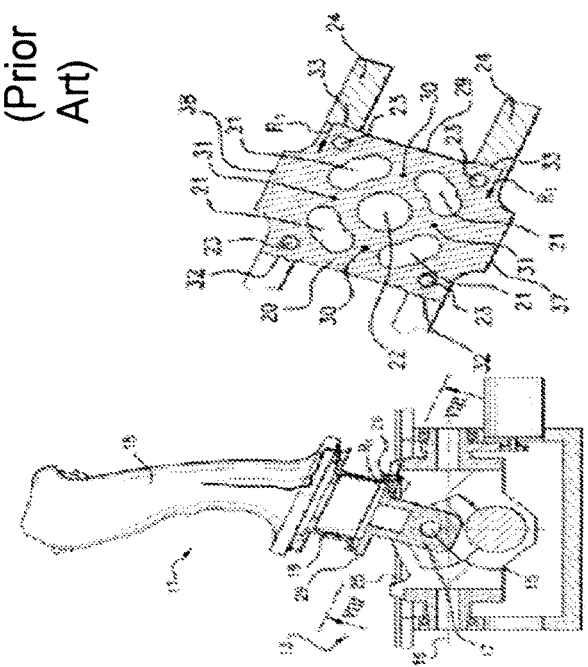
Figure 1
(Prior Art)

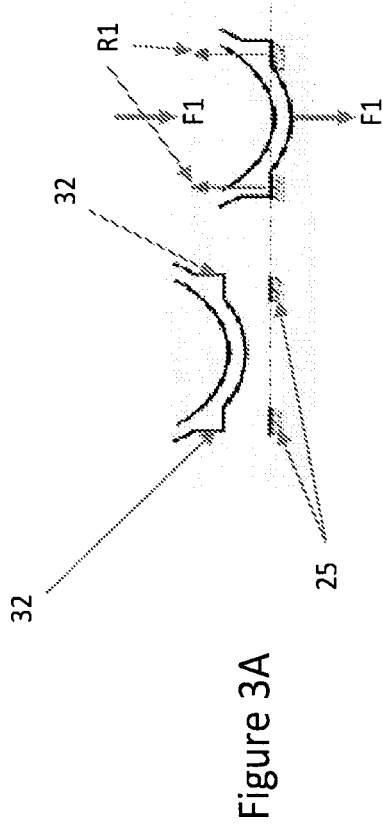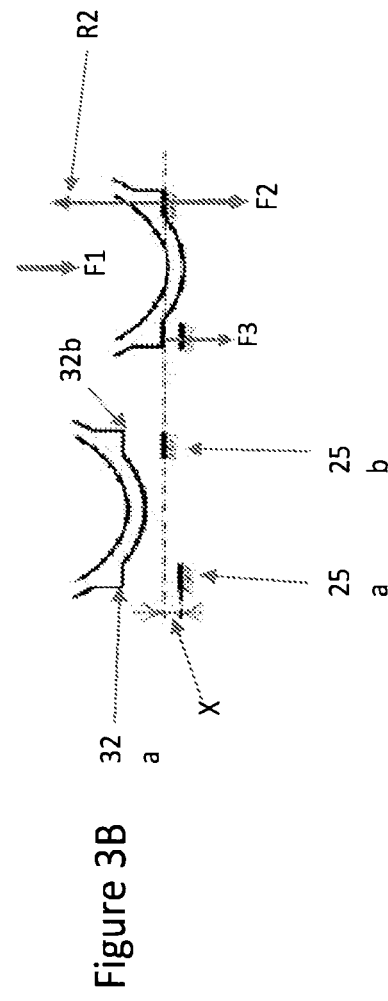
Figure 3A
Figure 3B

STOPS FOR FORCE SENSOR

CROSS-REFERENCE TO RELATED APPLICATIONS

This application claims priority to European Patent Application No. 22305488.3 filed Apr. 8, 2022, the entire contents of which is incorporated herein by reference.

TECHNICAL FIELD

The invention relates to piloting devices for piloting aircraft. The piloting devices typically comprise a piloting member suitable for being actuated by a pilot.

BACKGROUND OF THE INVENTION

Traditionally, a piloting device for piloting an aircraft comprises at least one piloting member connected, at least partially by a kinematic chain, to at least one flying member—in particular a control surface, an engine, etc.—of the aircraft, and possibly at least one motorised actuator, called a parallel actuator, having a driving member coupled in parallel in the kinematic chain so as to enable automatic piloting and/or to simulate a specific dynamic behaviour of the piloting member to bring about a return to neutral and create appropriate sensations (in particular muscular force sensations) enabling or facilitating the piloting by a human pilot.

Piloting devices with electrical flight controls, in which the flying members are not connected entirely mechanically by a kinematic chain to the piloting members have been developed for piloting certain aircrafts.

In systems such as, for example, those utilising a mini-stick for piloting aircraft, the piloting member is mounted and guided in rotation on two pivot joints with axes at least substantially orthogonal and intersecting one another (thus forming a centre-point rotary joint), making it possible to impart pitch and roll movements.

Such a piloting device generally comprises at least one force sensor measuring at least one component of the forces in the piloting device, by deformation of at least one deformable sensing element of the force sensor. Such a force sensor makes it possible, in particular, to carry out test flights, and supplies signals which are useful in the automatic actions associated with such piloting devices, for example for the coupling of a plurality of piloting members of the aircraft, and/or for delivering signals to an electronic device for operational control of the piloting device, and/or for the operation of the autopilot, and/or for control of motors associated with the degrees of freedom of the piloting member so as to achieve an electrically simulated variable force feedback sensation.

That being so, the aircraft piloting devices must be able to be subjected, for their certification, to maximum certification forces, the value of which is much higher than the nominal operational value of the forces during actual piloting of the aircraft. Typically, the value of the maximum certification forces is ten times greater than the nominal operational value. These certification forces are applied when the piloting member is placed in abutment with respect to the frame on one side or the other.

In order for the measurement of the forces to be as precise as possible, however, it is advisable to optimise the force sensor for the operational values of the forces applied in the piloting device, but not necessarily for the value of the certification forces. Thus, it must be possible to choose the force sensor so that it can have a measuring range covering the maximum operational value of the forces with a certain safety coefficient. In practice, the force sensor is chosen such that it can withstand 150% to 200% of the maximum operational value. In these conditions, it is advisable to avoid subjecting the force sensor directly to the value of the certification forces, which is liable to cause damage to or even destruction of the force sensor.

US 2013/0256463 A1 relates to a piloting device for piloting in aircraft comprising a mini-stick. In order to measure force applied to the mini-stick by a user in the pitch and roll axes, a force sensor in the form of a membrane is disposed between an upper part of the mini-stick forming a handle, and a lower part of the mini-stick coupled to the stick mounting and guiding mechanism. The membrane defines four radii configured to flex respectively under forward and rear pitch control and left and right roll control movement of the stick. Each radius defines a strain gauge and, as such, flexural deformation in one or more radii provides an electrical signal indicative of the force applied to the stick in a particular direction. In order to protect the radii from damage or breakage due to the excessive forces applied during certification, mechanical stops are provided on the mechanism cradle. Upon maximum rotation of the stick, the stops abut the membrane, imparting a force thereon. The reaction force from the stop acts parallel to the plane of the membrane and does not cause any significant flexure in the membrane, thereby not interfering with the force measurement and importantly protecting the membrane from damage during certification. Two stops are provided at each of the front and rear portions of the cradle and are designed such that the membrane contacts both stops simultaneously, providing a uniform forward or rear reaction force through the plane of the membrane. However, due to a multitude of variables present during the manufacture and assembly of the components for, and during the working life of, the piloting device, it can be very difficult to ensure that the two stops at either the front or rear of the cradle both contact the membrane simultaneously, either immediately after manufacture or over the course of the working life of the piloting device. Without simultaneous abutment of the force stops, the reaction force through the membrane is uneven and causes an erroneous roll force detected by the force sensor, compromising the flight control and/or force feedback functionality.

SUMMARY OF THE INVENTION

A piloting device for piloting an aircraft is provided comprising a piloting member suitable for being actuated by a pilot, a mechanism for mounting and guiding in rotation the piloting member about at least one rotation axis with respect to a frame, at least one force sensor connected between the piloting member and the mechanism comprising at least one sensing element configured to produce a signal upon deformation indicative of a force applied to the piloting member. The force sensor comprises at least one pair of bearing surfaces and at least one pair of stops configured to limit the angular amplitude of rotation of the piloting member with respect to the frame on abutment of the at least one pair of bearing surfaces with at least one pair of stops. The at least one pair of stops comprises a compliant material.

In some examples of the piloting device, the mechanism is configured to mount and guide the rotation of the piloting member about a first axis and the piloting member is configured to rotate about said first axis in a first direction and an opposite second direction.

In some examples of the piloting device, the rotation along the first axis of the piloting member in the first direction is limited by a first pair of stops comprising a compliant material configured to abut a corresponding first pair of bearing surfaces on the force sensor.

In some examples of the piloting device, the rotation along the first axis of the piloting member in the second direction is limited by a second pair of stops comprising a compliant material configured to abut a corresponding second pair of bearing surfaces on the force sensor.

In some examples of the piloting device, the mechanism is configured to mount and guide the rotation of the piloting member about a second axis and the piloting member is configured to rotate about said second axis in a third direction and an opposite fourth direction.

In some examples of the piloting device, the rotation along the second axis of the piloting member in the third direction is limited by a third pair of stops comprising a compliant material configured to abut a corresponding third pair of bearing surfaces on the force sensor.

In some examples of the piloting device, the rotation along the second axis of the piloting member in the fourth direction is limited by a fourth pair of stops comprising a compliant material configured to abut a corresponding fourth pair of bearing surfaces on the force sensor.

In some examples of the piloting device, the first axis and the second axis are orthogonal to one another.

In some examples of the piloting device, in each pair of stops, the compliant material is affixed to each of the stops on a side facing the force sensor.

In some examples of the piloting device, in each pair of stops, each stop further comprises a non-compliant material on a side of the compliant material facing the force sensor.

In some examples of the piloting device, each pair of bearing surfaces is provided with a compliant material on a side facing the corresponding pair of stops.

In some examples of the piloting device, in each pair of stops, each stop is provided with a mechanical feature configured to facilitate incorporation of compliant material therein.

In some examples of the piloting device, in each pair of bearing surfaces, each bearing surface is provided with a mechanical feature configured to facilitate incorporation of compliant material therein.

In some examples of the piloting device, the compliant material is provided with a mechanical feature configured to facilitate incorporation thereof into the stops of each pair of stops and/or the bearing surfaces of each pair of bearing surfaces.

In some examples of the piloting device, the compliant material comprises comprise one or more of rubber, silicone rubber, nitrile rubber, EPDM rubber, fluorosilicone rubber, neoprene rubber, butyl rubber, styrene-butadiene rubber and synthetic polymer.

A method of addressing a force sensor error is also provided, comprising moving one or more bearing surfaces of a force sensor of a piloting device into abutment with one or more mechanical stops, at least one of the bearing surfaces and/or at least one of the mechanical stops comprising a compliant material such as to ensure a symmetrical load by the one or more mechanical stops on the force sensor.

BRIEF DESCRIPTION OF DRAWINGS

FIG. 1 shows an example of a piloting device using a force sensor membrane and mechanical stops in the pitch and roll axes.

FIG. 3A is a schematic diagram showing the contact zones of the membrane and the pitch mechanical stops of a theoretical example of the piloting device of FIG. 1.

FIG. 3B is a schematic diagram showing the contact zones of the membrane and the pitch mechanical stops of a typically manufactured piloting device of FIG. 1.

DETAILED DESCRIPTION

Figure 2:
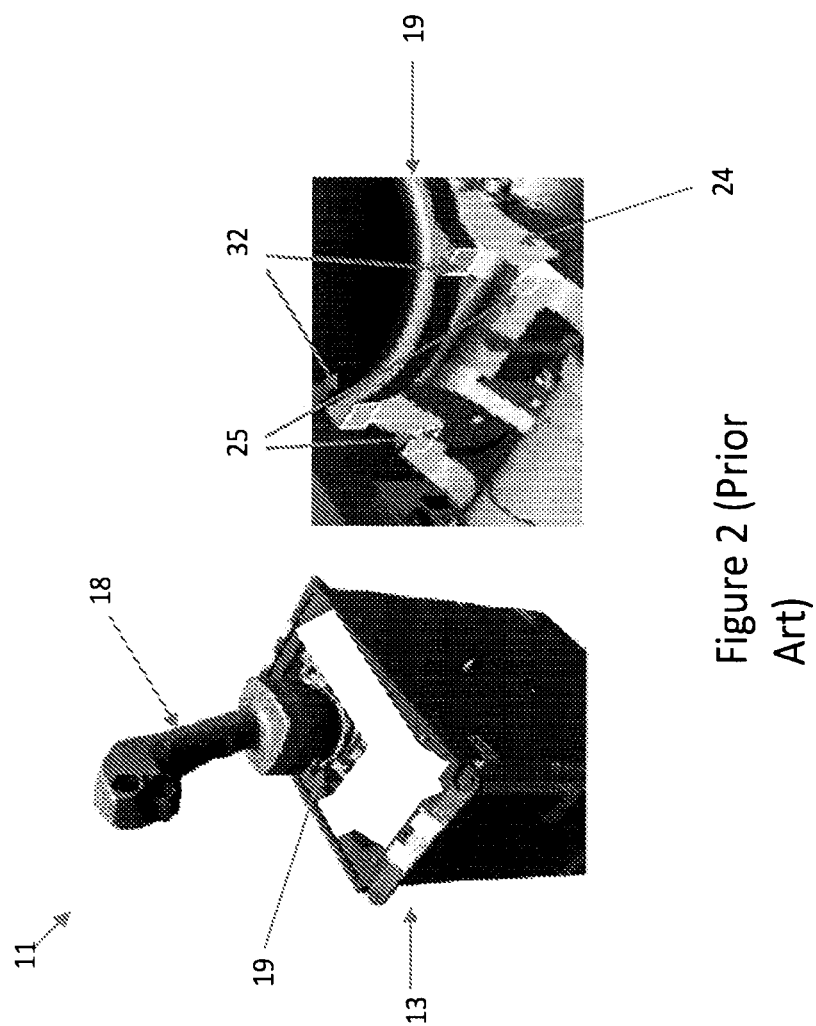
FIG. 2 shows another view of the piloting device shown in FIG. 1.

A known piloting device is shown in FIG. 1 and comprises a piloting member 11 which, in this example, is a mini-stick for piloting an aeroplane, mounted and guided to pivot with respect to a frame 12 fixed with respect to the aeroplane cabin by a mechanism 13 defining a centre-point rotary joint, comprising a cradle 14, a pivot axis 15 for pitch pivoting a lower end 17 of the mini-stick 11 with respect to the cradle 14, and a pivot axis 16 for roll pivoting of the cradle 14 with respect to the frame 12. The pivot axes 15, 16 are at least substantially orthogonal so that the mechanism defines a centre-point type rotary joint. Such a mechanism 13 for mounting and guiding in rotation an aeroplane mini-stick is well known and does not need to be described in more detail. Although the present invention is described herein as implemented exemplarily in a mini-stick-type device, it should be understood that the invention may be used in any type of piloting or steering device incorporating a force sensor. Any features of the piloting device described herein not present in the independent claims shall not be considered to be essential to the invention. For example, a piloting device for use with the present invention may utilise more or less than two pivot axes, and said pivot axes may not all be orthogonal to one another.

The mini-stick 11 has an upper part 18 which forms a handle adapted to be capable of being manipulated by a pilot, and a lower part 17 coupled to said mechanism 13. Between the upper part 18 and the lower end 17 of the mini-stick 11, the piloting device comprises a force sensor 19 in the form of strain gauges, constituted mainly, in the example shown, by a plane membrane 20 overall parallel to the pitch rotation axis 15 and roll rotation axis 16, and having four openings 21, so that this membrane 20 is flexurally deformed according to the value of the torque imparted on the handle 18 by the pilot, in pitch or in roll. Such a force sensor 19 in the general form of a plane membrane may have other embodiment variants, for example in the form of a membrane provided with a circular groove provided between recesses with respect to its lower face.

The membrane 20 has a central opening 22 which enables it to be fixed to the lower end 17 of the mini-stick 11. The openings 21 of the membrane 20 are evenly distributed about the central opening 22 so that the membrane 20 has four flexurally deformable radii 30, 31, of which two radii 30 are orthogonal to the pitch rotation axis 15, one on each side of the central opening 22, and two radii 31 are orthogonal to the roll rotation axis 16, one on each side of the central opening 22. In other embodiments, the force sensor 19 may have more or fewer than four openings, defining more or fewer than four deformable radii. The number of radii defines the total number of directions in which a force applied to the stick may be measured.

The radii 30, 31 are each provided with an electrical resistance suitable for constituting a flexural strain gauge. Furthermore, the membrane 20 is electrically connected to an electrical circuit (not shown) adapted to measure the variations in electrical resistance of each of the radii 30, 31 according to its flexural deformation. For example, the electrical resistances of the radii 30, 31 are arranged in a Wheatstone bridge circuit. Such a sensor with four gauges enables greater precision than a sensor with only one gauge. Two opposite nodes of the Wheatstone bridge are supplied with a DC voltage and the voltage is measured at the two other opposite nodes.

According to another possible embodiment variant, the force sensor 19 may be embodied in the form of a magnetostrictive sensor. To this end, the radii 30, 31 are produced from premagnetised ferromagnetic material. Such a ferromagnetic material exhibits a converse magnetostrictive effect, called a magnetomechanical effect, which is characterised by the modification of the magnetic susceptibility in the presence of mechanical stresses in the material. By adding magnetic field sensors (Hall effect sensors or others), the stress, hence the force, is measured directly.

The cradle 14 has two lateral end plates 24, between which the lower end 17 of the mini-stick 11 is articulated on the pitch rotation axis 15. The two lateral end plates 24 are parallel to one another and of the same shapes and dimensions. They define, at the front and at the rear, front stops 25 and rear stops 26 respectively, limiting the amplitude of angular deflection of the mini-stick 11 in pitch about the pitch rotation axis 15.

The front stop 25 of each end plate 24 is formed of an upwardly projecting shoulder of the end plate 24 adapted to have a plane wall portion which extends in a plane parallel to the pitch rotation axis 15 and is oriented rearwards slightly inclined upwards so as to be able to receive a portion of the peripheral edge 29 of the membrane 20 of the force sensor 19, this portion serving as a front contact bearing surface 32 for the front stop 25. Thus, the peripheral edge 29 of the membrane 20 has, towards the front, two plane front bearing surfaces 32 adapted to come into contact with the two front stops 25 of the two end plates 24 of the cradle 14.

The rear stop 26 of each end plate 24 is also formed of an upwardly projecting shoulder of the end plate 24 adapted to have a plane wall portion which extends in a plane parallel to the pitch rotation axis 15 and is oriented forwards slightly inclined upwards so as to be able to receive a portion of the peripheral edge 29 of the membrane 20 of the force sensor 19, this portion serving as a rear contact bearing surface 33 for the rear stop 26. Thus, the peripheral edge 29 of the membrane 20 has, towards the rear, two plane rear bearing surfaces 33 adapted to come into contact with the two rear stops 26 of the two end plates 24 of the cradle 14.

It should be noted that the stops 25, 26 formed by the cradle 14 limit the pitch displacement of the mini-stick 11, owing to the fact that the cradle 14 is itself integral with the frame 12 with regard to the pitch pivoting, and can pivot with respect to the frame 12 only about the roll rotation axis 16.

The frame 12 has an opening 34, through which passes the lower end 17 of the mini-stick 11, the cradle 14 being articulated to the frame 12 below this opening 34. The opening 34 defines, on the left and on the right of the mini-stick 11, left stop 35 and right stop 36 respectively, limiting the amplitude of angular deflection of the mini-stick 11 in roll about the roll rotation axis 16.

The left stop 35 is formed of a plane wall portion which extends in a plane parallel to the roll rotation axis 16 and is oriented towards the right slightly inclined upwards so as to be able to receive a portion of the peripheral edge 29 of the membrane 20 of the force sensor 19, this portion serving as a left contact bearing surface 37 for the left stop 35. Thus, the peripheral edge 29 of the membrane 20 has, towards the right, a central projecting portion defining a left plane bearing surface 37 adapted to come into contact with the left stop 35 of the frame 12.

The right stop 36 is formed of a plane wall portion which extends in a plane parallel to the roll rotation axis 16 and is oriented towards the left slightly inclined upwards so as to be able to receive a portion of the peripheral edge 29 of the membrane 20 of the force sensor 19, this portion serving as a right contact bearing surface 38 for the right stop 36. Thus, the peripheral edge 29 of the membrane 20 has, towards the left, a central projecting portion defining a right plane bearing surface 38 adapted to come into contact with the right stop 36 of the frame 12. In other embodiments, the pairs of stops are provided on the left and right of the stick, in the roll axis, in the same way that pairs of stops are provided at the front and rear, in the pitch axis. Corresponding pairs of bearing surfaces on each of the left and right of the membrane 20 are also provided in such an embodiment, such that each pair of stops on the left and right of the stick are configured to abut a corresponding pair of bearing surfaces on the membrane at maximum angular displacement to the left and right in the roll axis. In embodiments with more or fewer than four radii on the force sensor, any or all of the directions defined by the radii may be provided with a pair of mechanical stops to limit the angular displacement of the stick in that direction, and a pair of corresponding bearing surfaces on the membrane 20 configured to limit the angular displacement of the stick in that direction by simultaneous abutment of said stops and bearing surfaces.

In the example shown, the stops 25, 26, 35, 36, and the corresponding bearing surfaces 32, 33, 37, 38 extend orthogonally to the main plane of the membrane 20 when the mini-stick 11 is in abutment. Consequently, as shown in FIG. 1, the contact zone between a rear stop 26 and a rear bearing surface 33 is situated at the level of the plane of the membrane 20, and the abutment reaction R1 in pitch is oriented in the main plane of the membrane 20, in a tangential direction with respect to the pitch rotation axis 15, and stresses this membrane 20 in longitudinal compression/shearing, mainly outside its flexural deformation mode, so that the value of the abutment reaction R1 does not flexurally deform the radii of the membrane 20 and is not substantially measured by the force sensor 19. The same applies to the front stops 25 and the left and right stops.

In other words, for each stop of the piloting member, the abutment reaction has a negligible, component with regard to the flexural deformation mode of the membrane 20 of the force sensor 19. The force path passes through the membrane 20 in order to stress it in flexural deformation, so as to enable the measurement of the forces, in positions of the piloting member other than an abutment position, and for each abutment position of the piloting member in either direction, the force path does not significantly pass through the membrane 20 and no longer significantly stresses it flexurally.

An aircraft according to the invention comprising at least one such piloting device can be certified without risk of damage to each force sensor, but is equipped with a reliable and precise force sensor at each piloting member. It is therefore possible to stress the piloting member in abutment with a much greater force than the nominal operational force, for example for certification purposes, and to do so without risk of damaging the force sensor 19.

FIG. 2 shows another view of the piloting device 11 of FIG. 1. As previously described, the front stops 25 and the rear stops 26 are plural. That is, each of the front and rear abutment surfaces are provided by a pair of mechanical stops (the pair of front stops 25 shown in close-up on the right hand side of FIG. 2). With reference to FIG. 2, FIG. 3A and the front stops 25 of the piloting device 11, each front stop 25 is configured to contact a corresponding one of two bearing surfaces 32 of the membrane 20 when the stick 18 is at a maximum front pitch angular deflection. In an ideal example of the piloting device 11, as the stick 18 and therefore also the bearing surfaces 32 of the membrane 20 are moved towards the front stops 25, each of the front stops 25 simultaneously contacts a corresponding bearing surface 32. As more force is applied to the stick 18 in a front pitch direction, a force F1 is exerted through the bearing surfaces 32 onto the front stops 25. As the stops 25 are fixed with respect to the cradle 14, they do not move and instead exert an equal and opposite reaction force R1 to the bearing surfaces, parallel to the plane of the membrane 20.

In practice, for the piloting device 11, and in particular the abutment between the membrane 20 and stops 25, to work as described, a very high level of precision is required in manufacture and assembly of the constituent components. To achieve such a high level of precision can be technically challenging, and would involve advanced equipment/techniques and associated high costs. Using standard manufacturing methods, it is likely that the front or rear stops of the piloting device 11 will not simultaneously contact the bearing surfaces 32 upon full angular deflection of the stick. In some examples, this may be due to a lack of alignment of the end surfaces of the stops and/or a mismatch between the bearing surfaces on the membrane. Variations in the precision of assembly of the piloting device may also cause such a lack of simultaneous abutment of the stops and bearing surfaces. It is also envisaged that the piloting device may wear unevenly during its lifetime and cause the same issue.

FIGS. 3A and 3B are schematic diagrams showing, from above, the abutment of the bearing surfaces 32 of the membrane 20 with the front stops 25. However, due to imperfections in manufacture or assembly, or wear, the stops 25 and bearing surfaces 32 of the device of FIG. 3B do not simultaneously contact one another when brought into abutment. This means that when the membrane 20 moves towards the position of abutment with the stops 25, the membrane 20 comes initially into contact with just one of the stops 25b. The bearing surface 32a at this point not in contact with its corresponding front stop 25a, is separated therefrom by distance X. This distance X relative to the dimensions of the membrane 20, and device 11 in general, is exaggerated in the drawings, for ease of explanation. In actual practice, the distance X is likely to be small.

As can be seen in FIG. 3A, both stops 25 are brought into contact with their corresponding bearing surfaces 32 simultaneously and a force F1 imparted by the user perpendicular to the stops end surfaces generates an overall equal and opposite reaction force R1, distributed evenly through each bearing surface 32, parallel to the plane of the membrane 20. In the situation as shown in FIG. 3B, a portion F2 of the force F1 exerted on the stick 18 by a user is imparted onto the bearing surface 32b in contact with its corresponding front stop 25b, generating an equal and opposite reaction force R2 in the plane of the membrane 20. However, due to the lack of alignment of the stops 25, and therefore the gap of distance X between the other bearing surface 32a and its corresponding stop 25a, a remaining portion F3 of the force F1 imparted by the user acts on the membrane 20 without a reaction force being provided by the stop 25a. The remainder force F3, due to the abutment between surface 32b and 32a acting as a pivot, causes a rotational force in the membrane 20. This rotational force causes the radii 31 of the force sensor 19 to flex, thereby producing a reading in the force sensor 19 indicative of applied force in the roll axis. This is however erroneous, since this detected roll axis force arises purely from a pitch axis force imparted by the user. Erroneous readings of the force sensor are clearly undesired and can be problematic in flight critical applications. An erroneously detected roll force can interfere with operation of the aircraft, either in terms of the force-feel calculations and implementation, or with respect to the steering of the aircraft in systems which utilise the force sensor to generate readings used to control the aircraft.

Whilst the above discussion of the impact of the mismatch in alignment of the stops 25 on the force readings produced by the force sensor 19 is made with reference to the front stops 25 and the corresponding bearing surfaces 32, the same issues and consequences also exist with the rear stops 26 and their corresponding bearing surfaces 33. In embodiments comprising pairs of stops also limiting the angular displacement in the roll axis, the same potential problems also exist with respect to these stops and corresponding bearing surfaces. In embodiments comprising more or fewer than four sensor radii and a corresponding number of axes of rotation of the piloting member each provided with a pair of stops, the same problems exist also for these stops and corresponding bearing surfaces of the membrane 20.

Figure 4:
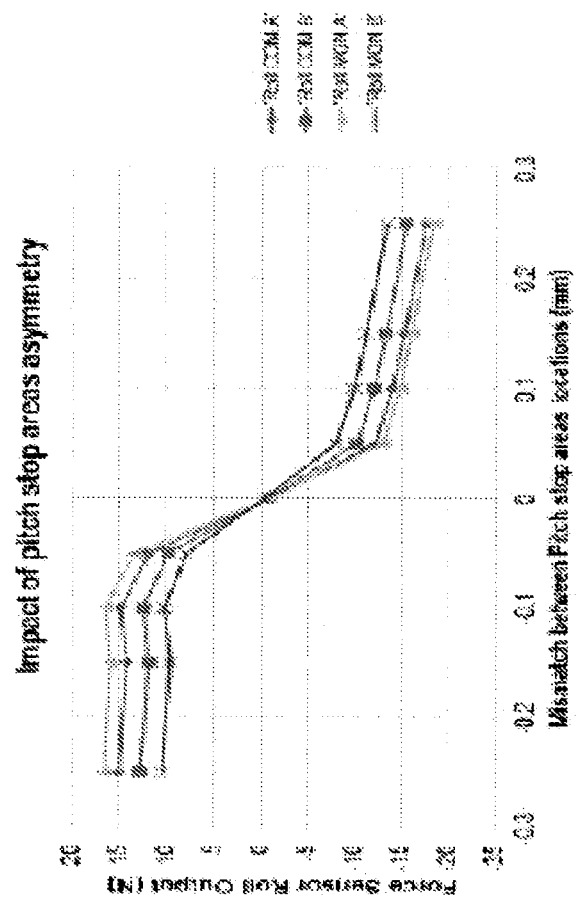
FIG. 4 is a graph showing the impact of pitch stop asymmetry on the erroneous roll output of the force sensor of the device of FIG. 1.

FIG. 4 is a graph showing the relationship between the mismatch in alignment of the force stops and the erroneous roll force measured as a result thereof. The mismatch in alignment of the force stops is displayed in millimetres on the x-axis and the erroneous roll force measured by the force sensor is displayed in Newtons on the y-axis. As can be seen from the graph, the greater the misalignment, or distance X, the greater the erroneous roll force measured by the force sensor is.

In order to address these issues, the present invention incorporates a mechanically compliant material in the stops 25, 26. A compliant material shall be understood as a material which is capable of being deformed upon application of a load thereon. In the context of the present invention, compliant shall mean susceptible to significant deformation under loads applied during test certification of the piloting device. During test certification, loads of up to around 1500N are applied to the piloting member. One example of material used in the compliant material is rubber, but other materials exhibiting similar compliant properties can also be used. For example, the compliant material may comprise one or more of silicone rubber, nitrile rubber, EPDM rubber, fluorosilicone rubber, neoprene rubber, butyl rubber, styrene-butadiene rubber or any other viscoelastic material such as synthetic polymer. Generally, compliant materials having a Young's modulus of from around 0.5 MPa to around 25 MPa are suitable to be used as the compliant material of the present invention.

Figure 5:
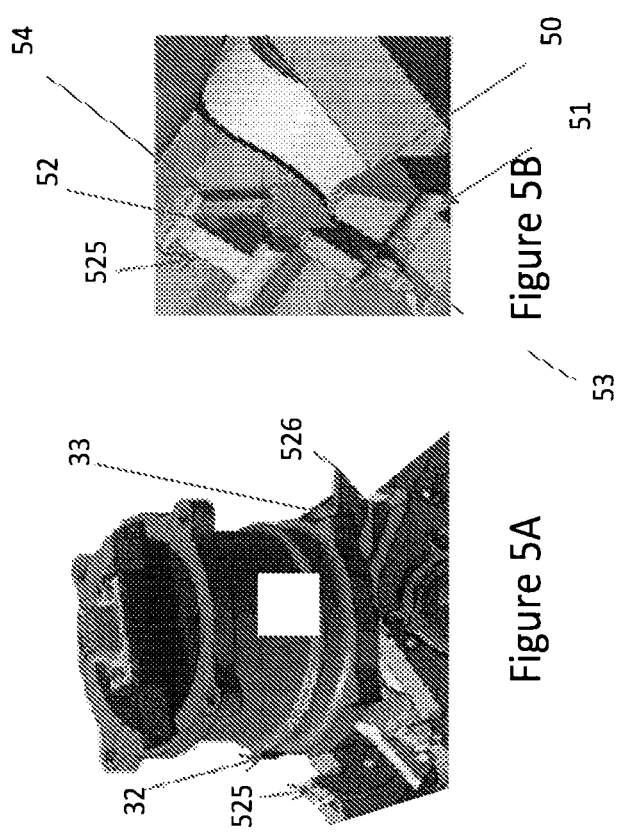
FIG. 5A shows an example of a section of a piloting device according to the present invention incorporating mechanical stops made from compliant material.
FIG. 5B shows an exploded view of a part of the piloting device of FIG. 5A comprising a mechanical stop.

In the example shown in FIGS. 5A and 5B, the stops 25 and 26 comprise one or more features which facilitate the incorporation of compliant material. The compliant material may comprise a compliant member 525, 526, which may comprise one or more features capable of interacting with the one or more features of the stops 25, 26 to facilitate incorporation or attachment thereto. In this example, the compliant members 525, 526 are secured to the mechanical stops 25, 26 by situating laterally extending portions 50 of the compliant members 525, 526 into a matching laterally extending groove 51 in the sides of the stops 25, 26 facing away from the membrane 20. The compliant members 525, 526 each comprise a narrow central portion 52 which extends longitudinally from the laterally extending portion 51 to a face portion 54. When coupled to a stop 25, 26, the central portion 52 extends through the cavity 53 in the stop 25, 26. Coupling the compliant members 525, 526 to the stops 25, 26 may involve longitudinal elastic deformation of the central portion 52 in order to fit the lateral portion 50 into the groove 51. The compliant members 525, 526 are then held in a coupled arrangement with the stops 25, 26 by virtue of the containment of the laterally extending portions 50 in the grooves 51. In operation, the face portion 54 is configured to be situated between the mechanical stops 25, 26 and the corresponding bearing surfaces 32, 33 of the membrane 20, when they are brought together into abutment. The advantage of providing the stops 25, 26 and compliant members 525, 526 with the features described in this embodiment is that the compliant material may be easily incorporated into the stops during assembly and maintenance, and may be replaced easily by an operator if needed.

The embodiment shown in FIGS. 5A and 5B is just one example of the incorporation of compliant material in mechanical stops of the piloting device 11. Compliant material can however be incorporated into/affixed to the mechanical stops using any suitable methods and with any suitable configuration of the stops and compliant material. For example, compliant members 525, 526 may be coupled to the mechanical stops 25, 26 via adhesive. Alternatively, compliant members 525, 526 may be attached to the stops 25, 26 using screws or other fasteners.

In other embodiments, compliant material may be alternatively or additionally incorporated into the bearing surfaces 32, 33. This has the effect that a compliant material is positioned between the force sensor and the mechanical stops, providing the same advantages as a compliant material incorporated into the mechanical stops. Incorporating compliant material into both a pair of mechanical stops and its corresponding pair of bearing surfaces avoids the risk of rubber stamping (permanent deformation) of the compliant material, were the compliant material incorporated into only one of the pair of mechanical stops or the corresponding pair of bearing surfaces.

In some embodiments, it may be sufficient, to achieve the advantages described above, to incorporate compliant material into just one of the stops of a pair of stops, or into just one bearing surface of a corresponding pair of bearing surfaces. In other embodiments, one of the stops of a pair of stops is provided with compliant material and one of the bearing surfaces of a corresponding pair of bearing surfaces is also provided with compliant material. This may be, for example, with compliant material being incorporated into a first stop of a pair of stops configured to abut a corresponding first bearing surface and with compliant material being incorporated into a second bearing surface of a pair of bearing surfaces configured to abut a second stop of a corresponding pair of stops. Of the four components in any pair of stops and its corresponding pair of bearing surfaces, any combination of these components including compliant material is envisaged; from just one component comprising compliant material to all four components comprising compliant material.

The provision of a compliant material, through incorporation of compliant members 525, 526, between the mechanical stops 25, 26 and the bearing surfaces 32, 33 of the piloting device described herein, remedies the problems associated with potential mismatches in alignment of the pairs of front and rear stops 25, 26. This will now be explained with reference to FIG. 6.

Figure 6:
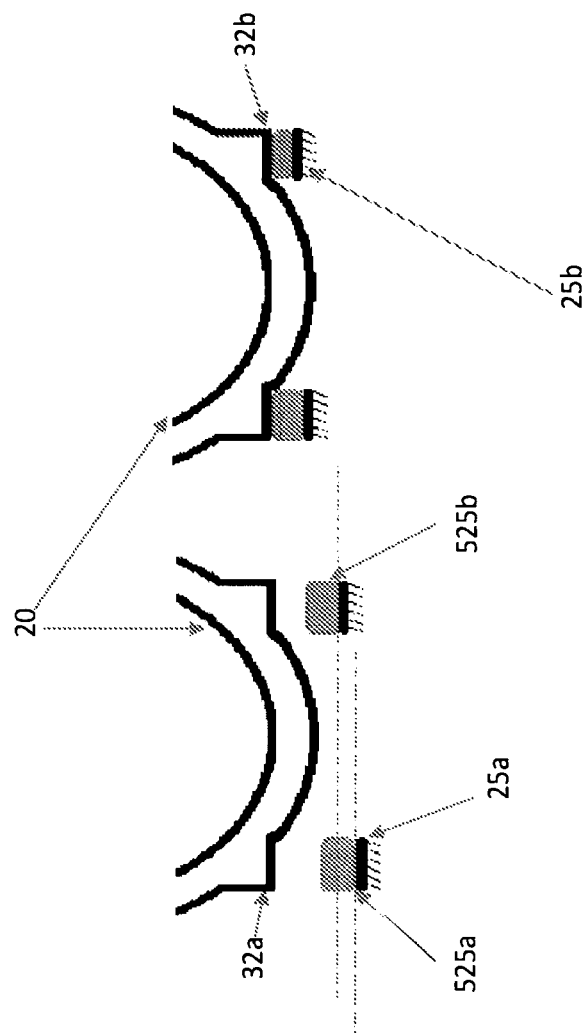
FIG. 6 shows a schematic diagram of the front bearing surfaces.

FIG. 6 shows a schematic diagram of the front bearing surfaces 32 of the membrane 20 and the front stops 25 shown from above. The figure is largely the same as FIG. 3B in that the front stops 25 and their corresponding bearing surfaces 32 do not simultaneously abut one another. However, in contrast to FIG. 3B, FIG. 6 shows an example of the membrane 20 and front stops 25 of the present invention, with compliant material incorporated into the latter. As shown in the figure, the compliant material is provided by compliant members 525. The compliant members, or at least a portion thereof, are positioned between the stops 25 and the bearing surfaces 32. Since the compliant members 525a and 525b are the same size and have the same thickness, as the membrane 20 is moved into an abutment position with the stops 25, the bearing surface 32b comes into contact with the compliant member 525b before the bearing surface 32a comes into contact with the compliant member 525a. As more force is applied, the compliant member 525b is compressed. During compression of the compliant member 525b, only a relatively small reaction force is exerted by the compliant member 525b on the bearing surface 32b, since only a relatively small force is required to compress the compliant member 525b. As more force is applied by the user, the bearing surface 32a comes into contact with the compliant member 525a. Compliant member 525a exerts a reaction force onto the bearing surface 32a. In this arrangement, the stop 25a is in indirect contact, via compliant member 525a, with the bearing surface. This means that both bearing surfaces 32 of the membrane 20 are brought into abutment with their corresponding stops 25, balancing the force distribution on both sides of the membrane 20. This greatly reduces any force imbalance as would be present without the compliant members 525 and therefore effectively eliminates unwanted rotational forces and strain on the radii 31 of the force sensor 19. The erroneous readings of roll axis force detected by the force sensor 19 under such undesired strain are thereby rendered negligible, or zero, restoring full function and accuracy of the piloting device, while providing protection from damage to the force sensor during certification.

In some embodiments, to protect the compliant material, a harder non-compliant surface, which may be made from the same material as the stops, may be provided on a surface of the compliant material facing the membrane 20. In these embodiments, the compliant material is still free to deform between this surface and the stop, thereby providing the same advantages.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A piloting device for piloting an aircraft, comprising:
   a piloting member suitable for being actuated by a pilot;

a mechanism for mounting and guiding in rotation the piloting member about at least one rotation axis with respect to a frame;
at least one force sensor connected between the piloting member and the mechanism comprising at least one sensing element configured to produce a signal upon deformation indicative of a force applied to the piloting member,
wherein the force sensor comprises at least one pair of bearing surfaces; and
at least one pair of stops configured to limit the angular amplitude of rotation of the piloting member with respect to the frame on abutment of the at least one pair of bearing surfaces with at least one pair of stops,
wherein at least one of the stops and/or at least one of the bearing surfaces comprises a compliant material;
wherein compliant material is affixed to at least one stop on a side facing the force sensor;
wherein each stop including compliant material further comprises a non-compliant material on a side of the compliant material facing the force sensor.

2. The piloting device of claim 1, wherein the mechanism is configured to mount and guide the rotation of the piloting member about a first axis, the piloting member configured to rotate about said first axis in a first direction and an opposite second direction.

3. The piloting device of claim 2, wherein the rotation along the first axis of the piloting member in the first direction is limited by a first pair of stops configured to abut a corresponding first pair of bearing surfaces on the force sensor.

4. The piloting device of claim 2, wherein the rotation along the first axis of the piloting member in the second direction is limited by a second pair of stops configured to abut a corresponding second pair of bearing surfaces on the force sensor.

5. The piloting device of claim 2, wherein the mechanism is configured to mount and guide the rotation of the piloting member about a second axis, the piloting member configured to rotate about said second axis in a third direction and an opposite fourth direction.

6. The piloting device of claim 5, wherein the rotation along the second axis of the piloting member in the third direction is limited by a third pair of stops configured to abut a corresponding third pair of bearing surfaces on the force sensor.

7. The piloting device of claim 5, wherein the rotation along the second axis of the piloting member in the fourth direction is limited by a fourth pair of stops configured to abut a corresponding fourth pair of bearing surfaces on the force sensor.

8. The piloting device of claim 5, wherein the first axis and the second axis are orthogonal to one another.

9. The piloting device of claim 1, wherein at least one of the bearing surfaces is provided with a compliant material on a side facing the corresponding pair of stops.

10. The piloting device of claim 1, wherein at least one of the stops is provided with a mechanical feature configured to facilitate incorporation of compliant material therein.

11. The piloting device of claim 1, wherein at least one of the bearing surfaces is provided with a mechanical feature configured to facilitate incorporation of compliant material therein.

12. The piloting device of claim 1, wherein the compliant material is provided with a mechanical feature configured to facilitate incorporation thereof into at least one of the stops and/or at least one of the bearing surfaces.

13. A method of addressing a force sensor error, comprising
moving one or more bearing surfaces of a force sensor of a piloting device as recited in claim 1 into abutment with the one or more mechanical stops.

* * * * *